United States Patent [19]
Itoh

[11] Patent Number: 5,316,996
[45] Date of Patent: May 31, 1994

[54] COMPOUND OXIDE CATALYST CARRIER, METHOD OF PRODUCING THE SAME AND METHOD OF TREATING HEAVY OIL WITH THE SAME

[75] Inventor: Toshio Itoh, Sodegaura, Japan

[73] Assignee: Idemitsu Kosan Co., Ltd., Tokyo, Japan

[21] Appl. No.: 883,259

[22] Filed: May 14, 1992

[30] Foreign Application Priority Data

Jun. 3, 1991 [JP] Japan .................. 3-157360

[51] Int. Cl.$^5$ .................. B01J 21/00; B01J 32/00
[52] U.S. Cl. .................. 502/238; 502/263; 502/351; 502/439
[58] Field of Search .................. 502/238, 239, 351, 5, 502/263, 439

[56] References Cited

U.S. PATENT DOCUMENTS

| | | | |
|---|---|---|---|
| 2,964,481 | 12/1960 | Cramer et al. | 502/238 |
| 3,120,496 | 2/1964 | Plank et al. | 252/455 R |
| 3,840,477 | 10/1974 | Braithwaite et al. | 252/455 R |
| 3,972,833 | 8/1976 | Michalko et al. | 252/458 |
| 4,196,101 | 4/1980 | Wilson et al. | 502/351 |
| 4,631,267 | 12/1986 | Lachman et al. | 502/351 |

OTHER PUBLICATIONS

Database WPIL, accession No. 82-84905E [40], Derwent Publications Ltd., London, GB; & JP-A-57 140 645, Aug. 31, 1982; Abstract.
Database WPIL, accession No. 88-054676 [08], Derwent Publications, Ltd., Lond, GB; & JP-A-63 012 346, Jan. 19, 1988. Abstract.
Database WPIL, accession No. 88-195378 [28], Derwent Publications Ltd., London, GB; & JP-A-63 134 060, Jun. 6, 1988. Abstract.

*Primary Examiner*—Carl F. Dees
*Attorney, Agent, or Firm*—Frishauf, Holtz, Goodman & Woodward

[57] ABSTRACT

A compound oxide catalyst carrier which comprises a silica-alumina or a titania-alumina and has a relative standard deviation of peak intensity of aluminum ranging from 0.100 to 0.170, as measured by scanning a cross section of a particle of the compound oxide catalyst carrier with an EPMA in a scan-line direction along a diameter-line or an approximate diameter-line of the cross section, has a moderately uniform aluminum concentration distribution in solid particles a moderate acidity and, therefore, is suitable for use as a catalyst carrier requiring attrition resistance and ability of inhibiting generation of coke or excessive cracking, such as a carrier of catalysts for production of middle distillate fractions by a suspension bed process hydrocracking of heavy oil.

12 Claims, 1 Drawing Sheet

Fig. 1(A)
Fig. 1(B)
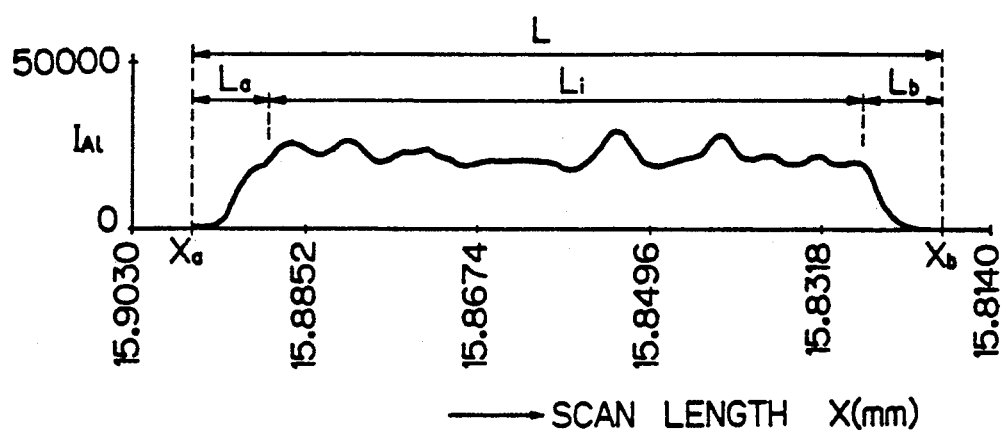
Fig. 1(C)
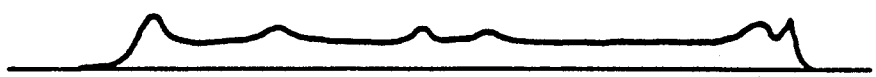
Fig. 1(D)

COMPOUND OXIDE CATALYST CARRIER, METHOD OF PRODUCING THE SAME AND METHOD OF TREATING HEAVY OIL WITH THE SAME

BACKGROUND OF THE INVENTION (a) Field of the Invention

The present invention relates to a compound oxide catalyst carrier which comprises silica-alumina or titania-alumina and is a useful catalyst or catalyst carrier for use in various processes, such as petroleum refining processes. Particularly, the present invention relates to a compound oxide catalyst carrier consisting of silica-alumina or titania-alumina or containing them as main components, which has a moderately uniform aluminum concentration distribution in solid particles, has a moderate acidity due to the absence of strong acid sites and is excellent particularly in attrition resistance and, therefore, is suitable for use as a catalyst carrier requiring attrition resistance and ability of inhibiting generation of coke or excessive cracking, such as a carrier of catalysts for production of useful middle distillate fractions by a suspension bed process hydrocracking of heavy oil.

The present invention further relates to a suitable method of producing the above-described compound oxide catalyst carrier.

The present invention further relates to a method of treating heavy oil for producing middle distillates efficiently, wherein heavy oil is hydrocracked by the above-described compound oxide catalyst carrier.

(b) Description of the Related Art

Hydrocracking of heavy oil, such as atmospheric residue, vacuum residue or petroleum derived from coal, shale or tar sands, using solid catalysts has been carried out for producing more useful middle distillates (MD). Such hydrocracking of heavy oil is generally conducted by a suspension bed process wherein catalyst particles are mixed with heavy oil and contact is made between the mixture and hydrogen, and the catalysts used have requirements for high attrition resistance as well as a requirement for good reaction results including a high yield of middle fraction of distillate and generation of little coke.

As the techniques for the hydrocracking of heavy oil by a suspension bed process, there have been proposed a method using FCC spent catalysts (specification of U.S. Pat. No. 4,082,648) and a method using direct desulfurization spent catalysts. For the above-described hydrocracking of heavy oil, however, the FCC spent catalysts are insufficient in catalytic activity, causing problems including a low yield of middle distillates (MD) and generation of much coke, and on the other hand, the direct desulfurization spent catalysts are not so poor in catalytic activity, but their mechanical strength is insufficient for saving them from attrition.

Other commonly proposed catalysts for suspension bed process hydrocracking of heavy oil than the above-described direct desulfurization spent catalysts are those comprising acidic compound oxide carriers, such as silica-alumina or titania-alumina, supporting metallic components, such as Ni-Mo, Co-Mo or Ni-W.

However, the conventional silica-alumina and titania-alumina, because of their extremely high acidity and insufficient mechanical strength including poor attrition resistance, are unsuitable either as the carriers of catalysts for suspension bed process hydrocracking of heavy oil or as other catalysts or catalyst carriers requiring high attrition resistance, so that their use is limited.

SUMMARY OF THE INVENTION

An object of the present invention is to solve the problems described above and to provide an improved silica-alumina or titania-alumina catalyst carrier which is a compound oxide catalyst carrier having excellent mechanical strength, such as high attrition resistance, and having moderate acidity due to the absence of strong acid sites and, therefore, is suitable for use as a catalyst carrier or a catalyst for processes requiring high mechanical strength, including high attrition resistance, and capability of inhibiting generation of coke and excessive cracking, in particular, as a catalyst carrier of catalysts for suspension bed process hydrocracking of heavy oil.

Another object of the present invention is to provide a simple and efficient method of producing the compound oxide catalyst carrier, namely the improved silica-alumina or titania-alumina catalyst carrier.

Another object of the present invention is to provide a method of treating heavy oil for hydrocracking the heavy oil by a suspension bed process using a catalyst supported by the compound oxide catalyst carrier of the present invention to obtain middle distillates efficiently.

In order to develop a catalyst which, in the hydrocracking of heavy oil by a suspension bed process, produces good reaction results, such as a high yield of useful middle distillates and a reduced quantity of by-products, such as coke, and as well exhibits excellent attrition resistance, the inventors paid attention to improvement of the silica-alumina or titania-alumina catalyst carrier for supporting the above-described metallic components, such as nickel, molybdenum, tungsten and cobalt, and studied diligently. Consequently, they found that an excellent catalyst satisfying the requirements of sufficient reaction results (such as a high yield of middle distillates and generation of little code) and excellent attrition resistance in a suspension bed process hydrocracking of heavy oil could be obtained by using a specific silica-alumina or titania-alumina catalyst carrier having a moderately uniform concentration distribution of aluminum along diameter-lines of cross sections of particles thereof (that is, the concentration distribution of aluminum over the whole inside of the particles) and using specific metallic components to be supported by the carrier. Further, in contrast with the conventional silica-alumina which generally has strong acid sites and considerably high acidity, the improved silica-alumina or titania-alumina catalyst carrier described above was, in particular, even the silica-alumina was confirmed to have moderate acidity due to the absence of strong acid sites, so that it is useful not only as a catalyst carrier for the above-described suspension bed process hydrocracking of heavy oil but also as a catalyst carrier or a catalyst for various fields requiring moderate acidity and high mechanical strength including high attrition resistance.

Further, the inventors made a study of a suitable method for producing the compound oxide catalyst carrier of the present invention (that is, the improved silica-alumina or titania-alumina catalyst carrier), and found that a particularly simple and efficient method is mixing an alumina gel containing a specific ratio of gel particles having a specific range of particle size with a silica sol or titania sol, followed by molding, drying and calcination.

That is, the present invention provides a compound oxide catalyst carrier which comprises a silica-alumina or a titania-alumina and has a relative standard deviation (the value obtained by dividing the standard deviation by the average value) of peak intensity of aluminum ranging from 0.100 to 0.170 as measured by scanning a cross section of a particle of the compound oxide catalyst carrier with an EPMA in a scan-line direction along a diameter-line or an approximate diameter-line of the cross section.

The present invention further provides a suitable method of producing the compound oxide catalyst carrier of the present invention, which comprises mixing an alumina gel which contains, as measured as alumina, at least 70% by weight of particles of 4 to 20 μm in particle size based on total weight of alumina, with a silica sol or a titania sol to obtain a mixture, forming the mixture into particles, drying the particles and calcining the dried particles.

The present invention further provides a method of treating a heavy oil comprising mixing a heavy oil with a catalyst which comprises the compound oxide catalyst carrier of the present invention and a metal of Groups VIa or VIII of the Periodic Table supported on the compound oxide catalyst, and hydrocracking the heavy oil by a suspension bed process.

BRIEF DESCRIPTION OF THE DRAWING

FIGS. 1(A), 1(B), 1(C) and 1(D) show EPMA spectrum charts obtained by linear analysis of cross sections of particles. In FIGS. 1, (A) and (B) show, respectively, EPMA spectrum charts of cross sections of particles of the silica-alumina used in Example 1 and of a cross section of a particle of the titania-alumina used in Example 2, and (C) and (D) show, respectively, EPMA spectrum charts of cross sections of particles of the conventional silica-alumina used in Comparative Examples 1 and 2 for the purpose of comparison.

DESCRIPTION OF THE PREFERRED EMBODIMENTS

The compound oxide catalyst carrier of the present invention is a catalyst carrier of a compound oxide type which comprises silica-alumina or titania-alumina. The compound oxide catalyst carrier of the present invention preferably has a composition of so called silica-alumina or titania-alumina, but may contain other components insofar as the object of the present invention is accomplished, and also may comprise the three, silica, titania and alumina.

One of the most important points of the present invention is that the compound oxide catalyst carrier has a relative standard deviation (the value obtained by dividing the standard deviation by the average value) of peak intensity of aluminum ranging from 0.100 to 0.170 as measured by scanning a cross section of a particle of the compound oxide catalyst carrier with an EPMA in a scan-line direction along a diameter-line of the cross section. Hereinafter, the relative standard deviation of peak intensity of aluminum as defined above in the present invention will be sometimes represented by $D_{Al}$.

EPMA is a common name of the Electron Probe X-ray Microanalyzer ("X-ray" is sometimes omitted), with which the composition in a micro spot on a substance is analyzed by irradiating accelerated electron rays to the micro spot and observing the generating characteristic X-rays. The EPMA is generally used for line analysis of cross sections of solid particles, such as catalyst particles or carrier particles, by scanning electron rays, for example, in order to measure the concentration distribution of a specified element (metallic element) in the particles along a diameter-line. This analysis provides information on the concentration distribution of a specific element or changes of the composition in a particle in the depth direction (in the direction from the surface to the center).

In the present invention, the measurement and calculation of the relative standard deviation ($D_{Al}$) of the peak intensity of aluminum with the above-described EPMA were conducted on a cross section of a subject particle as follows, according to a line analyzing technique of cross sections of particles in the diameter direction with an EPMA which is common in the field of catalysts. First, distribution of peak intensity (count number: $I_{Al}$) of aluminum along the X-axis of the position coordinates in the direction of a diameter-line (the scan-line direction of electron rays) is measured to obtain a series of data (X, $I_{Al}$), second the simple average $(I_{Al})_{av}$ and the standard deviation S are calculated from the data (X, $I_{Al}$), and finally $(I_{Al})_{av}$ is divided by S to obtain a value, which is the relative standard deviation ($D_{Al}$) described above. In order to avoid inaccuracy of the data due to the edge effects of the cross sections of particles, it is desirable to obtain the above-described $(I_{Al})_{av}$ and S and to calculate $D_{Al}$ by using only the line analysis data ($I_{Al}$) of the inside exclusive of the both ends of the cross section of particles (generally, the inside resulting from excluding 10% length of the diameter from the both ends of diameter in which the line analysis is carried out). Such $D_{Al}$ may also be obtained by conducting the above-described line analysis with EPMA on only the inside of cross sections of particles exclusive of 10% length from each end of the particles.

In the present invention, an EPM810Q [trade name, produced by Shimazu Corp., electron ray resolution: 6 nm, acceleration voltage: 0–30 kV, analyzing crystal: RAP (Rubidium acid phthalate)] was used for the above-described line analysis of cross sections of particles to obtain the relative standard deviation $D_{Al}$ of peak intensity of aluminum, namely the EPMA measurement of $I_{Al}$ in the direction along a diameter-line.

The line analysis of cross sections of particles along diameter-lines (the measurements of $I_{Al}$ along the X-axis of the position coordinates) may be carried out according to the technique common in the field of catalysts as described above, and practically, the following is a suitable procedure for conducting the analysis.

First a catalyst carrier particle to be measured is buried in an appropriate matrix resins, and the whole body is ground until a cross section of the catalyst carrier particle buried therein appears. Subsequently, the catalyst carried particle exposing the cross section is subjected to an EPMA measurement as follows.

(1) Thus obtained sample is arranged so that the cross section of the catalyst carrier particle comes into the observation field of vision of the EPMA measurement.

(2) From a typical end (the starting point) to an opposite end (the end point) of the cross section of the particle in the direction of a diameter-line (when the cross section is not circular, the direction corresponding to a diameter), electron rays are scanned while the intensity of the characteristic X-ray of aluminum generating from the spots irradiated with the electron rays ($I_{Al}$) was counted continuously to perform the line analysis with an EPMA.

Thus obtained is a chart showing the changes of $I_{Al}$ (count number of the characteristic X-rays of Al, this is to be repeated in the following) with the changes of the position coordinates in the X-axis (scan length) in the direction of a diameter-line (the scan-line direction described above). An example of the chart is shown in FIG. 1. In FIG. 1, (A) and (B) show, respectively, the charts obtained by the above-described EPMA line analysis of cross sections of particles of a silica-alumina and a titaniaalumina alumina which are examples of the compound oxide catalyst carrier of the present invention, and (C) and (D) show, respectively, the charts obtained by the same EPMA line analysis of cross sections of particles of the conventional silica-alumina as carriers for comparison with the present invention. In FIGS. 1(A) to 1(D), the vertical axis is the scan length X (mm) in the direction of a diameter (the scan-line direction) in the above-described EPMA line analysis, and in order to facilitate comparing data of particles of different sizes, the scales of the horizontal axes of the charts are adjusted so that each end of the cross sections of particles (the positions $X_a$ and $X_b$ where $I_{Al}$ becomes approximately zero correspond to the both ends of each of the measured particle) align on the same lines, respectively. Therefore, the scales of the horizontal axes of FIGS. 1(A), 1(C) and 1(D) do not always coincide with the scale (values) of the horizontal axis of FIG. 1(B). In FIGS. 1(A) to 1(C), the vertical axis of each chart shows $I_{Al}$ (count numbers of the characteristic X-rays of Al).

The above-described average value ($I_{Al}$)$_{av}$ and standard deviation S are calculated by general methods for obtaining the simple average and standard deviation from the data $I_{Al}$ in the inside ($L_1$) excluding both end parts ($L_a$ and $L_b$) of particles [each $L_a$ and $L_b$ is 0.1 time as long as the diameter L of a cross section, and therefore, $L_a = L_b = 0.1L = 0.1(X_b - X_a)$]. From the viewpoint of accuracy, it is preferable to obtain the values of $I_{Al}$ (count numbers) with a digital display at a plurality of points of the X-axis of the position coordinates with a proper distance, and calculating the average value ($I_{Al}$)$_{av}$ and the standard deviation S using a series of digital data (X, $I_{Al}$) thus obtained.

Of course, the calculations of ($I_{Al}$)$_{av}$ and S do not necessarily require display of charts.

From the thus obtained simple average ($I_{Al}$)$_{av}$ and the standard deviation S thereof, the relative standard deviation $D_{Al}$ can be calculated according to the equation, $S/[(I_{Al})_{av}] = D_{Al}$.

Since the silica-alumina or titania-alumina catalyst carrier (particularly, silica-alumina and titania-alumina) of the present invention having the $D_{Al}$ obtained as described above within a specific range, from 0.100 to 0.170, has in each carrier particle thereof a moderately unbalanced distribution of aluminum component which provides a moderately uniform composition over the whole particle, each particle has, over the whole particle, a sufficiently high mechanical strength whereby the catalyst carrier of the present invention is endowed with an extremely excellent attrition resistance. The compound oxide catalyst carrier of the present invention including silica-alumina or titania-alumina is therefore suitable for the use as a catalyst or a catalyst carrier requiring high attrition resistance, such as the catalyst or catalyst carrier to be used for reactions of suspension bed processes.

Further, since the compound oxide catalyst carrier of the present invention has a more unbalanced distribution of aluminum than that of the conventional silica-alumina, it does not have excessive and inconvenient active sites (for example, strong acid sites and active sites causing generation of coke or excessive cracking) but has a moderate acidity. Therefore, the compound oxide catalyst carrier of the present invention is advantageous in that when used for reactions wherein generation of coke easily occurs, such as hydrocracking of heavy oil, it can prohibit the generation of coke sufficiently, and when used for hydrocracking of heavy oil or other petroleums for the purpose of production of middle distillates, it can improve considerably the yield of the middle distillates as compared with the conventional ones.

In the compound oxide catalyst carrier of the present invention (silica-alumina or titania alumina catalyst carrier), the preferred content of $Al_2O_3$ component is 70 to 30% by weight, and the preferred content of $SiO_2$ component or $TiO_2$ component is 30 to 70% by weight. If the content of $Al_2O_3$ component is more than 70% by weight, the mechanical strength may become insufficient for the use as a catalyst, thereby decreasing the attrition resistance. If the content of $Al_2O_3$ component is less than 30% by weight, the function of $Al_2O_3$ as a catalyst or catalyst carrier may become insufficient, and, for example, when used as a catalyst carrier for the hydrocracking of heavy oil described below, it may fail to produce good reaction results.

The method of producing the compound oxide catalyst carrier of the present invention is not particularly limited, and may be produced by various methods. However, it is generally suitable to employ the following method.

That is, the compound oxide catalyst of the present invention can be produced suitably by mixing an alumina gel which contains, as measured as alumina, at least 70% by weight of particles of 4 to 20 μm in particle size based on total weight of alumina, with a silica sol or a titania sol to obtain a mixture, forming the mixture into particles, drying the particles and calcining the dried particles (this method will sometimes be called producing method I).

In the producing method I, it is important to use as an alumina source an alumina gel containing at least 70% by weight (on the above-described basis) of alumina gel particles having the above-described specific range of particle size. The content of the alumina gel particles of 4 to 20 μm in particle size in alumina gel is measured and evaluated as follows.

After a calcination at 550° C. to reduce the solid content to 35% by weight of the original weight, a picture of alumina gel particles was taken with an optical microscope, and the diameters of 400 to 500 particles on the picture were measured. When the diameters of the particles are too small to measure, the magnification of the microscope was increased or the picture was magnified to enable the measurement.

If the content (on the above-described basis) of the alumina gel particles of 4 to 20 μm in particle size in the alumina gel used is less than 70% by weight, it will be difficult to adjust the value of $D_{Al}$ obtained by the EPMA measurement within the range of 0.100 to 0.170 as in the silica-alumina or titania-alumina catalyst carrier, such as silica-alumina or titania-alumina, of the present invention, and the obtained compound oxides will be suffered by inconveniences, such as generation of strong acid sites or insufficient mechanical strength including attrition resistance. Consequently, when the obtained compound oxides, such as silica-alumina or titania-alumna, are used as carriers of the catalysts for suspension bed process hydrocracking of heavy oil as described below, desired effects cannot be made, and problems will arise, for example, insufficient reaction results, such as generation of coke or an increase of the quantity of cracked products other than the useful middle distillates, and an insufficient attrition resistance of the catalysts.

The alumina gel to be used in the method of the present invention (producing method I) may be suitably produced, for example, by the following method.

An alumina gel is produced by using various combinations of compounds which generate alumina gel by a neutralizing reaction (for example, various known combinations, such as an aqueous sodium aluminate solution+an aqueous aluminum sulfate and an aqueous ammonia+an aqueous aluminum sulfate solution), and the alumina gel is aged generally at temperatures ranging from 10° to 90° C. for 0 to 24 hours, so that the content (on the above-described basis) of alumina gel particles of 4 to 20 μm in particle size becomes at least 70% by weight. If an appropriate alumina gel is available, for example commercially, it may be used as it is or after adjustment of the particle size distribution as described above.

Thus obtained alumina gel is added to a silica sol or a titania sol in predetermined ratios, preferably after filtration and washing with water, and is then mixed and uniformalized by a common method.

The silica sol or titania sol to be used in the present invention is not particularly limited, and various kinds of ones, such as those on the market and synthetic ones may be used. Suitable silica sol is of an aqueous solution type, and preferred examples include SNOWTEX S (trade name, produced by Nissan Chemical Industries, Ltd. Preferred examples of the titania sol include CS-C produced by Ishihara Sangyo Kaisha, Ltd. The ratios of the alumina gel used and the silica sol used are preferably such that the content of the alumina component ranges from 70 to 30% by weight and the content of the silica or titania component ranges from 30 to 70% by weight. The reason for that is as described above. According to demand, other components than the above-described alumina gel and silica sol or titania sol may be added, insofar as the object of the present invention is accomplished. It is also possible to add and mix both of the silica sol and the titania sol to the above-described alumina gel, to obtain a compound oxide catalyst carrier comprising silica-alumina and titania-alumina.

According to the method of the present invention (producing method I), a desired compound oxide catalyst carrier, such as silica-alumina or titania-alumina, is obtained by molding, drying and calcining the gel mixture resulting from the above-described mixing.

The molding, drying and calcination may be conducted by general procedures, in a desired order, and in order to produce a relatively small fine particle carrier, such as the carrier of the catalysts for the suspension bed process hydrocracking of heavy oil as described below, it is preferable to carry out the molding and the drying simultaneously by spray drying the gel mixture, and to carry out calcination thereafter.

The calcination is suitably carried out by a general air calcination. The calcining temperature is generally 500° to 700° C., preferably 550° to 650° C. Excessively low calcining temperatures may sometimes result in an insufficient mechanical strength, such as a poor attrition resistance, and excessively high calcining temperatures may cause sintering, thereby decreasing the surface area.

Thus, the silica-alumina or titania-alumina compound oxide catalyst carrier, such as silica-alumina or titania-alumina, of the present invention is produced easily and efficiently.

The compound oxide catalyst carrier of the present invention produced by the above-described method may be used for various uses.

That is, the catalyst carrier of the present invention may be used as a carrier for various catalysts to be prepared according to purposes, or it itself may be used as a catalyst (for example, as a weak solid acid catalyst). For example, it may be used as a carrier catalyst with proper catalyst components, such as metallic components, supported thereon, or may be used as a mixture or composite catalyst by mixing it with other catalysts. In the process of producing the catalyst carrier, other components, such as metallic components, may be added thereto or supported thereon to form a catalyst or a composite carrier.

In particular, the compound oxide catalyst carrier, such as silica-alumina or titania-alumina, of the present invention is suitable as a carrier of supported metal catalysts used for the following method of producing middle distillates by a suspension bed process hydrocracking of heavy oil, namely, the method of treating heavy oil according to the present invention.

That is, the method of the present invention for treating heavy oil comprises mixing a heavy oil with a catalyst which comprises the compound oxide catalyst carrier of the present invention and a metal of Groups VIa or VIII of the Periodic Table supported on the compound oxide catalyst, and hydrocracking the heavy oil by a suspension bed process. According to the method of the present invention, useful middle distillates can be produced from various kinds of heavy oils with a high yield and a high efficiency.

Various kinds of the compound oxide catalyst carriers of the present invention may be used as the carrier, and, in general, preferred is silica-alumina or titania-alumina, and particularly preferred is those obtained by the above-described producing method I. For the reasons described above, preferred are those having a content of alumina component of 70 to 30% by weight and a content of silica or titania component of 30 to 70% by weight.

The metals of Group VIa and/or Group VIII of the Periodic Table to be supported as metallic components on the carrier may be used individually or as a combination of two or more metals, and preferred examples include nickel, a combination of nickel and molybdenum, molybdenum, a combination of nickel and tungsten, and a combination of cobalt and molybdenum.

These metallic components may be supported on the carrier by using proper metal compounds according to various methods, such as known supporting methods, including vacuum impregnation, kneading and dipping.

It is desirable to control the quantities of the supported metallic components so that the total of the metals ranges generally from 0.5 to 20% by weight, preferably from 3 to 15% by weight of the resulting catalyst.

According to demand, the catalyst may be used together with other components supported thereon or added thereto, insofar as the object of the present invention is accomplished.

Prior to use in reactions, thus obtained catalyst may be optionally pretreated as in common procedures, for example, by a reduction treatment.

According to the method of the present invention for treating heavy oils, the above-described catalyst and a heavy oil are mixed, and hydrogen or a hydrogen-containing gas is made in contact with the mixture to carry out hydrocracking of the heavy oil by a suspension bed process and to produce useful middle distillates.

The reaction apparatus to be used may be suspension bed process reaction apparatuses commonly used in the art.

The reaction temperature is generally 300° to 550° C., preferably 350° to 500° C., and the reaction pressure is generally 20 to 300 kg/cm$^2$, preferably 50 to 200 kg/cm$^2$. Although the reaction by a suspension bed process may be conducted by a non-continuous method, such as a batch method, or a semi-continuous method, such as a semi-batch method, a continuous flow method is generally desirable from the view point of the productivity. In a continuous flow method, it is suitable to adjust the LHSV (liquid hourly space velocity) generally to 0.05-5 hr$^{-1}$, preferably 0.2-2 hr$^{-1}$.

Preferred examples of the heavy oil to be used as a reaction material include various ones, such as atmospheric residue, vacuum residue or petroleum derived from coal, shale or tar sands, and particularly preferred are atmospheric residue, vacuum residue and petroleum derived from tar sand.

Thus, useful middle distillates can be produced from heavy oils with a high yield. Since the compound oxide catalyst carrier of the present invention is used as a carrier in the method of the present invention, generation of coke, such as deposition of coke on the catalyst, is little in quantity, and generation of undesired by-products, such as lower hydrocarbons, is also prohibited sufficiently, and, in addition, even if the reaction is continued for a long time, the high mechanical strength of the catalyst carrier, such as the excellent attrition resistance, prevents considerably the catalyst from damage and loss due to attrition thereof.

The method of the present invention for treating heavy oils, therefore, is extremely improved in the process efficiency and cost and is superior to the methods using supported metal catalysts or FCC spent catalyst supported by the conventional silica-alumina, etc.

Hereinafter, the present invention will be described in detail referring to Examples and Comparative Examples, but these Examples do not limit the scope of the present invention.

EXAMPLES 1 AND 2 AND COMPARATIVE EXAMPLES 1 AND 2

In the following Examples and Comparative Examples, various evaluations and measurements were carried out as follows.

(1) Reaction evaluation (suspension bed process hydrocracking of heavy oil)

By using a 300-ml autoclave, 80 g of an Arabian heavy vacuum residue as a material oil and 10 g of a catalyst are charged therein, and a reaction was carried out at 450° C. and 85 kg/cm$^2$G for one hour.

(2) Evaluation of the solid acidity of catalyst carries (evaluation using a cracking reaction of cumene as a testing reaction)

A stainless steel reaction tube with a glass-coated inside was filled with 0.1 g of a carrier molded into 0.5 to 1.0 mm in size, and a pretreatment was carried out in a stream of gaseous hydrogen of 80 ml/min in rate for three hours. 1 μl of cumene was injected into the tube at a reaction temperature of 200° C. to obtain the cracking ratios (mol %) of cumene to propylene and benzene.

(3) Preparation of samples for EPMA measurements

A catalyst carrier was buried in fused methyl methacrylate, and after methyl methacrylate was solidified, the whole body was ground until cross sections of the buried catalyst carrier appeared. Electron rays were irradiated to one of the exposed cross sections of the catalyst carrier in the direction along a diameter-line, to carry out a line analysis. Concrete procedures of the sample preparation and the concrete conditions of the EPMA measurement are as follows.

The method of sample preparation 3 volume parts of a sample catalyst was mixed with 5 volume parts of methyl methacrylate, and after molding by heating and pressing for 20 minutes, grinding was carried out with a sand paper so that samples surfaces were exposed, and gold was evaporated onto the exposed surface to a thickness of 100 to 200 angstrom.

Conditions of EPMA measurement

| | |
|---|---|
| acceleration voltage | 15 KV |
| sample current | 50 nA (50 × 10$^{-9}$A) |
| analyzing crystal | for Al: rubidium acid phthalate (RAP) |
| | for Si: pentaerythritol |

(4) Measurement of the concentration distribution of a particular element (aluminum) on cross sections of samples using an EPMA Measurements and calculations of the standard deviation, average value and relative standard deviation were carried out as follows.

1. Positioning was carried out so that a catalyst particle came into the observation field of vision.
2. After excluding 10% from both ends of the catalyst particle respectively, scanning was carried out in the direction along a diameter-line, and the intensity of characteristic X-rays was counted.
3. Thus, the following data were obtained.

| ADDRESS (mm) | | |
|---|---|---|
| X | Y | DATA (count number) |
| 15.7260 | 13.2480 | 21333 |
| 15.7250 | 13.2480 | 23807 |
| 15.7240 | 13.2480 | 24743 |
| 15.7230 | 13.2480 | 24394 |
| (the values to be here were omitted) | | |
| 15.6470 | 13.2480 | 28648 |
| 15.6460 | 13.2480 | 26511 |
| 15.6450 | 13.2480 | 27495 |
| 15.6440 | 13.2480 | 25882 |

4. The simple average and standard deviation of count numbers were obtained from these data by common methods.

5. The relative standard deviation was obtained by dividing the standard deviation by the simple average.

(5) Supplemental description of the EPMA spectrum charts (FIGS. 1(A) to 1(D))

For the purpose of simplification, each spectrum shown in the charts includes the parts of the both ends of the catalyst (edges). The horizontal axis is the scan length, X, and the vertical axis is the intensity of the characteristic X-rays of aluminum, $I_{Al}$ (count number). The positions where the count number is approximately 0 correspond to both ends of the observation surface of the catalyst, $X_a$ and $X_b$.

(6) Attrition resistance test 50 g of a carrier prepared in an apparatus for the attrition resistance test of fluid catalytic cracking catalysts was flown at the room temperature for 42 hours at a linear velocity of the air of 287 m/sec, and the lost weight % of the carrier (initial attrition ratio) at the time 12 hours after the beginning of flowing and the lost weight % of the carrier (attrition index) at the time after the carrier was further flown for 30 hours were measured, respectively. The smaller the measured values, the better the attrition resistance.

(7) Properties of the material oil (heavy oil)

TABLE 1

| Material oil | Arabian heavy vacuum residue (VR-AH) |
| --- | --- |
| Properties | |
| Specific gravity (15/4° C.) | 1.0216 |
| Kinematic viscosity (cSt) | |
| 100° C. | 1400 |
| 120° C. | 400 |
| 150° C. | 100 |
| Pour point (°C.) | +45.0 |
| Sulfur content (wt %) | 4.85 |
| Nitrogen content (wt %) | 0.324 |
| Metal content (ppm) | |
| Vanadium | 110 |
| Nickel | 34 |
| Iron | 15 |
| Residual carbon (wt %) | 20.5 |
| Total carbon (wt %) | 84.6 |
| Total hydrogen (wt %) | 9.9 |
| Analyzed composition | |
| Asphaltene content (wt %) | 7.5 |
| Resin content (wt %) | 20.9 |
| Aromatics content (wt %) | 52.9 |
| Saturate content (wt %) | 18.7 |

EXAMPLE 1

To one liter of an aqueous sodium aluminate solution containing alumina in a quantity providing a content of $Al_2O_3$ of 10% by weight added was one liter of an aqueous aluminum sulfate solution containing alumina in a quantity providing a content of $Al_2O_3$ of 5% by weight, and an alumina gel was prepared at pH 7. The alumina gel was filtered and washed twice with ion-exchanged water.

The alumina gel was dispersed in ion-exchanged water to make a content of $Al_2O_3$ of 15% by weight, and was aged at a concentration of aqueous ammonia of 5.6% by weight and at 45° C. until 70% by weight of the alumina gel particles became 4 to 20 μm in size.

To one liter of aged alumina gel suspension containing aged alumina in a quantity providing a content of $Al_2O_3$ of 10% by weight added was one liter of silica sol (Trade name: SNOWTEX S, produced by Nissan Chemical Industries, Ltd.) containing silica in a quantity providing a content of $SiO_2$ of 10% by weight, and then mixing, spray drying with a spray drier and calcination were carried out under common conditions. The resulting silica-alumina carrier contained 50% by weight of alumina and 50% by weight of silica.

The alumina distribution in the obtained silica-alumina was measured with an EPMA. The results are shown in FIGS. 1(A) to 1(D). The attrition resistance of the carrier was measured with an attrition resistance measuring apparatus.

The obtained carrier was made to support 3% by weight of nickel and 8% by weight of molybdenum on the basis of the catalyst standard.

Reaction activity evaluation of the catalyst was carried out in a 300-ml autoclave by carrying out a reaction using 80 g of the material Arabian heavy vacuum residue and 10 g of the catalyst, for one hour at 450° C. at a pressure of 85 kg/cm²G. The results are shown in Table 2 together with other results. Evaluation of the solid acidity of the obtained carrier was carried out based on the cracking ratio of cumene.

COMPARATIVE EXAMPLE 1

An silica-alumina was prepared in the same manner as in Example 1 with the exception that the aging procedure in Example 1 was omitted, but the alumina gel agglomerates were ground with a homogenizer. The obtained alumina gel particles were 3 μm or less in diameter (0% by weight of 4 to 20 μm). Thereafter, the same procedure as in Example 1 was repeated. The results are shown in Table 2.

COMPARATIVE EXAMPLE 2

The same procedure as in Example 1 was repeated with the exception that aging was carried out until 70% by weight of alumina gel particles became 20 to 34 μm (30% by weight of 4 to 20 μm) in diameter. The results are shown in Table 2.

EXAMPLE 2

The procedure of preparing a carrier employed in Example 1 was repeated with the exception that titania sol (Trade name: CS-C, produced by Ishihara Sangyo Kaisha, Ltd.) was used in place of alumina gel, and thereafter, the same procedure as the subsequent procedure in Example 1 was repeated. The results are shown in Table 2.

TABLE 2

| | Example 1 | Comparative examples 1 | Comparative examples 2 | Example 2 |
| --- | --- | --- | --- | --- |
| Particle size of alumina gel (μm) (ratio of 4–20 μm, wt %) | 6–18 90 | 3–10 50 | 12–30 60 | 6–18 90 |
| Alumina distribution analyzed with EPMA (relative standard deviation) | 0.15 | 0.08 | 0.19 | 0.14 |
| Solid acidity of carriers (cracking ratio of cumene, mol %) | 0 | 22 | 0 | 0 |
| Attrition resistance of carriers (attrition index, wt %/30 hr) | 2.7 | 4.0 | 18.3 | 2.8 |
| Reaction results | | | | |

TABLE 2-continued

| | Example 1 | Comparative examples 1 | Comparative examples 2 | Example 2 |
|---|---|---|---|---|
| Gas ($C_1$-$C_4$) | 7.9 | 13.2 | 8.0 | 8.6 |
| Naphtha ($C_5$-174° C.) | 15.8 | 18.2 | 17.3 | 16.3 |
| MD (174-343° C.) | 31.2 | 26.3 | 29.9 | 31.6 |
| VGO (343-525° C.) | 26.4 | 16.6 | 22.2 | 24.6 |
| VR (525° C.+) | 9.7 | 7.6 | 11.1 | 10.2 |
| Sludge (deposited asphaltene) | 4.8 | 5.1 | 4.4 | 4.2 |
| Coke (toluene-insoluble content) | 4.2 | 13.1 | 7.1 | 4.5 |
| VR conversion (wt %) | 85.5 | 67.3 | 84.5 | 86.6 |

MD: middle distillates,
VGO: vacuum as oil,
VR: vacuum residue

What is claimed is,

1. A compound oxide catalyst carrier, comprising: a silica-alumina, the compound oxide catalyst carrier having a relative standard deviation of peak intensity of aluminum ranging from 0.100 to 0.170 as measured by scanning a cross section of a particle of the compound oxide catalyst carrier with an Electron Probe X-ray Microanalyzer in a scan-line direction along a diameter-line or an approximate diameter-line of the cross section.

2. The compound oxide catalyst carrier as claimed in claim 1, wherein the compound oxide catalyst carrier contains 30 to 70% by weight of alumina and 70 to 30% by weight of silica or titania, based on total weight of the compound oxide catalyst carrier.

3. A method of producing the compound oxide catalyst carrier of claim 1, comprising: mixing an alumina gel which contains, as measured as alumina, at least 70% by weight of particles of 4 to 20 μm in particle size based on total weight of alumina, with a silica sol or a titania sol to obtain a mixture, forming the mixture into particles, drying the particles and calcining the dried particles.

4. A method of producing the compound oxide catalyst carrier of claim 2, comprising: mixing an alumina gel which contains, as measured as alumina, at least 70% by weight of particles of 4 to 20 μm in particle size based on total weight of alumina, with a silica sol or a titania sol to obtain a mixture, forming the mixture into particles, drying the particles and calcining the dried particles.

5. The compound oxide catalyst carrier as claimed in claim 2 which is said silica-alumina.

6. The compound oxide catalyst carrier as claimed in claim 2 which is said titania-alumina.

7. The method of claim 3, wherein the calcining is carried out at a temperature of 500° to 700° C.

8. The method of claim 3, wherein the calcining is carried out at a temperature of 550° to 650° C.

9. The method of claim 4, wherein the calcining is carried out at a temperature of 500° to 700° C.

10. The method of claim 4, wherein the calcining is carried out at a temperature of 550° to 650° C.

11. The method of claim 3, which further comprises aging the alumina gel by heating the alumina gel at a temperature of 10° to 90° for at most 24 hours whereby at least 70% by weight of the alumina gel has a particle size of 4 to 20 μm.

12. The method of claim 4, which further comprises aging the alumina gel by heating the alumina gel at a temperature of 10° to 90° C. for at most 24 hours whereby at least 70% by weight of the alumina gel has a particle size of 4 to 20 μm.

* * * * *